(12) United States Patent
Cahill

(10) Patent No.: US 8,180,548 B2
(45) Date of Patent: May 15, 2012

(54) DECELERATION CONTROLLED BRAKING

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 451 days.

(21) Appl. No.: 12/429,297

(22) Filed: Apr. 24, 2009

(65) Prior Publication Data

US 2010/0274457 A1 Oct. 28, 2010

(51) Int. Cl.
*B60T 8/00* (2006.01)
*B60T 8/32* (2006.01)

(52) U.S. Cl. ........... 701/79; 701/70; 701/71; 701/74; 701/75; 303/126; 303/138; 303/168; 303/171

(58) Field of Classification Search ............ 701/70, 701/71, 74, 75, 78, 79; 303/126, 138, 166, 303/168, 171, 172
See application file for complete search history.

(56) References Cited

U.S. PATENT DOCUMENTS

| | | | | |
|---|---|---|---|---|
| 3,520,575 A * | 7/1970 | Steigerwald | ............... | 303/126 |
| 3,702,714 A * | 11/1972 | Branson | ............... | 303/126 |
| 4,043,607 A * | 8/1977 | Signorelli et al. | ............... | 303/112 |
| 4,138,164 A * | 2/1979 | Masclet | ............... | 303/185 |
| 4,180,223 A * | 12/1979 | Amberg | ............... | 244/111 |
| 4,610,484 A | 9/1986 | Amberg et al. | | |
| 4,725,953 A * | 2/1988 | Rolland et al. | ............... | 701/71 |
| 5,233,528 A * | 8/1993 | Phipps et al. | ............... | 701/79 |
| 5,333,942 A * | 8/1994 | Peczkowski et al. | ............ | 303/183 |
| 6,178,370 B1 * | 1/2001 | Zierolf | ............... | 701/71 |
| 6,722,745 B2 * | 4/2004 | Salamat et al. | ............... | 303/126 |
| 6,951,372 B2 * | 10/2005 | Salamat et al. | ............... | 303/112 |
| 7,865,289 B2 * | 1/2011 | Dellac et al. | ............... | 701/70 |
| 7,938,494 B2 * | 5/2011 | Ribbens et al. | ............... | 303/112 |
| 2008/0015766 A1 * | 1/2008 | Butler et al. | ............... | 701/79 |

FOREIGN PATENT DOCUMENTS

EP 0936116 8/1999

OTHER PUBLICATIONS

Patents Act 1977: Search Report under Section 17(5) dated Apr. 19, 2010.

* cited by examiner

*Primary Examiner* — Ruth Ilan
(74) *Attorney, Agent, or Firm* — Snell & Wilmer L.L.P.

(57) ABSTRACT

A system, apparatus and method of controlling a brake system of a vehicle having a brake input device, such as a brake pedal, a plurality of rotating wheels and a plurality of brakes, each brake of the plurality of brakes corresponding to one wheel of the plurality of wheels, is provided. In controlling the brakes, data indicative of a deflection of the brake pedal is received, and the received data is used to derive a target deceleration rate. A braking command is provided to each of the plurality of brakes, wherein the braking command is varied for each brake to regulate a deceleration rate the vehicle in accordance with the target deceleration rate.

16 Claims, 7 Drawing Sheets

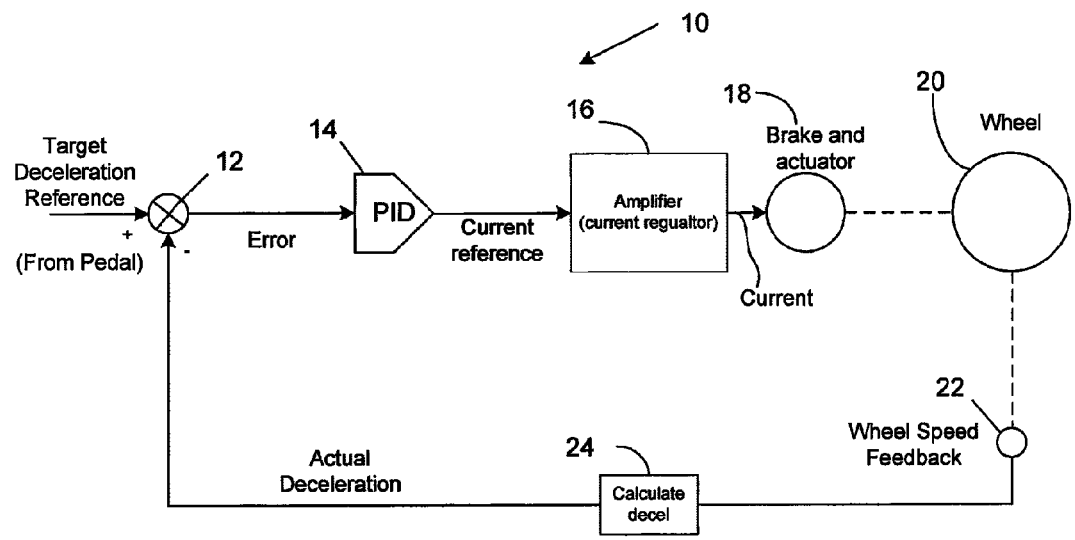
FIG. 1
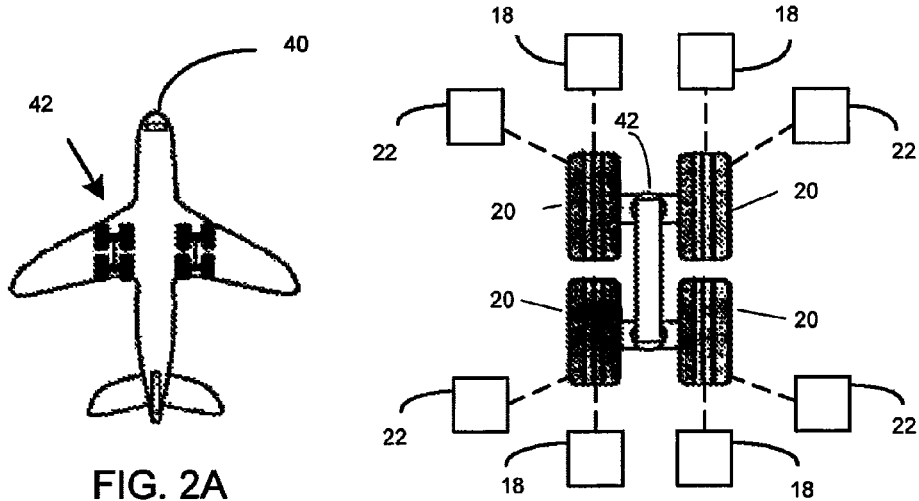
FIG. 2A
FIG. 2B

DECELERATION CONTROLLED BRAKING

FIELD OF THE INVENTION

The present invention relates generally to brakes and, more particularly, to a method, apparatus, and system for controlling brakes of a vehicle.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuators that extend to compress the brake disk stack against the back plate. Torque is taken out by the stator disks through a static torque tube or the like.

To control operation of each brake assembly, a brake system control unit (BSCU) is typically employed, wherein the BSCU is operatively coupled to each brake assembly. The BSCU typically includes a microprocessor that executes a control algorithm which, based on a target brake pressure, commands the actuators to apply a force such that the actual brake pressure equals the target brake pressure.

The BSCU also implements anti-skid braking control. As is known in the art, anti-skid braking control detects, via wheel speed sensors or the like, when one or more wheels are in a skid condition. The BSCU will modulate a brake command signal provided to the brake corresponding to the skidding wheel, thereby bringing the wheel out of the skid.

Hydraulic braking systems generally are controlled using a pressure feedback scheme. For example, a target pressure signal (e.g., from a brake pedal) is provided to the BSCU, and the BSCU, via a servo valve or the like, controls the hydraulic pressure supplied to the brake actuators to satisfy the target pressure signal. Electric braking systems operate in a manner similar to hydraulic braking systems, but instead of regulating hydraulic pressure, a force applied by the actuators is regulated. The applied force may be directly measured by force sensors, or implied from position sensors (e.g., from a position of the actuator). The applied force or actuator position then may be equated to a pressure applied by the brakes.

In both hydraulic and electric brake configurations, the target brake pressure reference is derived from a brake pedal. More particularly, the brake pedal provides a target brake pressure reference to the BSCU, wherein brake pedal deflection is proportional to the target brake pressure reference.

SUMMARY OF THE INVENTION

The present invention provides a system, apparatus and method that enables vehicle braking without the use of pressure sensors, force sensors or position sensors. More particularly, instead of controlling the brakes based on closed-loop pressure, force or position control, the brakes are controlled based on data indicative of vehicle deceleration. To implement deceleration control, data corresponding to wheel or vehicle speed is utilized (e.g., data from wheel speed sensors), and a braking force is applied so as to decelerate the vehicle in accordance with a target deceleration rate. Such wheel speed sensors are already present in many conventional braking systems, as they are utilized to implement anti-skid operation. Thus, additional sensors are not required. Moreover, pressure, force and/or position sensors are no longer needed, and control of these parameters can be via open-loop control. This minimizes costs and reduces weight of the system.

Further, brake pedal deflection, instead of being utilized to provide a target pressure reference as is done in conventional braking systems, is utilized to provide a target deceleration rate. Based on the target deceleration rate, the BSCU controls the actuators such that the vehicle and/or wheels decelerate in accordance with the target deceleration rate.

According to one aspect of the invention, a brake controller and method are provided for controlling a brake system of a vehicle having a brake input device, such as a brake pedal, a plurality of rotating wheels and a plurality of brakes, each brake of the plurality of brakes corresponding to one wheel of the plurality of wheels. The brake controller and method can: receive data indicative of a deflection of the brake pedal; use the data indicative of the deflection of the brake pedal to derive a target deceleration rate; and provide a braking command to each of the plurality of brakes, wherein the braking command for each brake is varied to regulate a deceleration rate the vehicle in accordance with the target deceleration rate. The controller and method can further receive data indicative of wheel deceleration or vehicle deceleration, and use the data indicative of wheel deceleration or vehicle deceleration to regulate the deceleration rate of the vehicle.

In one embodiment, the deceleration rate can be regulated without using force or pressure data indicative of a force or pressure applied by the brake, or position data indicative of brake actuator position.

Further, a braking load between at least two brakes and/or brake actuators can be shared (e.g., equalized). In sharing the brake load, a braking load applied by the at least two brakes and/or actuators can be averaged, and the average braking load can be used as the braking command for at least one of the at least two brakes and/or brake actuators.

In yet another embodiment, wheel speed data from a plurality of wheel speed sensors can be provided, each wheel speed sensor corresponding to one wheel of the plurality of wheels and operative to provide data indicative of wheel speed. A deceleration rate of each wheel can be calculated from the corresponding wheel speed sensor, and the calculated deceleration rate for each wheel can be individually summed with the target deceleration rate to obtain a deceleration rate error for each wheel.

According to another aspect of the invention, a brake system for applying a braking force to a plurality of rotatable wheels of a vehicle includes a plurality of brakes, and a brake controller operatively coupled to the plurality of brakes, wherein the controller is configured to control the brakes based on deceleration, without the need to monitor actuator pressure, force or position. Each brake can be associated with a corresponding one of the plurality of wheels and be operative to provide a braking force to the respective wheel. The brake system also may include a brake pedal configured to provide a signal indicative of pedal deflection, as well as a plurality of wheel speed sensors. Each wheel speed sensor may correspond to one wheel of the plurality of wheels and be configured to provide data indicative of wheel speed.

In one embodiment, at least two wheels may be configured so as to rotate at substantially the same angular velocity, and each wheel may be associated with one brake of the plurality of brakes. The at least one controller can be configured to share a brake load between brakes of the at least two wheels.

In another embodiment, the at least two wheels comprise a first wheel and a second wheel having a first brake and second brake, respectively. Further, the at least one controller can comprise a first controller configured to generate a first braking command corresponding to the first brake, and a second controller configured to generate a second braking command corresponding to the second brake, the first and second braking commands indicative of a braking force to be applied by the corresponding first and second brakes. A least one of one of the first controller or the second controller can be configured to receive brake data indicative of the braking force applied by the brake corresponding to the other of the first controller or the second controller, and modify the brake command for the brake corresponding to one of the first controller or second controller based on the brake data corresponding to the other of the first controller or the second controller.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

FIG. 1 illustrates an exemplary control loop for controlling a brake system in accordance with the invention.

FIGS. 2A-2B are schematic diagrams illustrating, respectively, an exemplary aircraft having bogie landing gear, and a landing gear of the aircraft.

DETAILED DESCRIPTION

Figure 3:
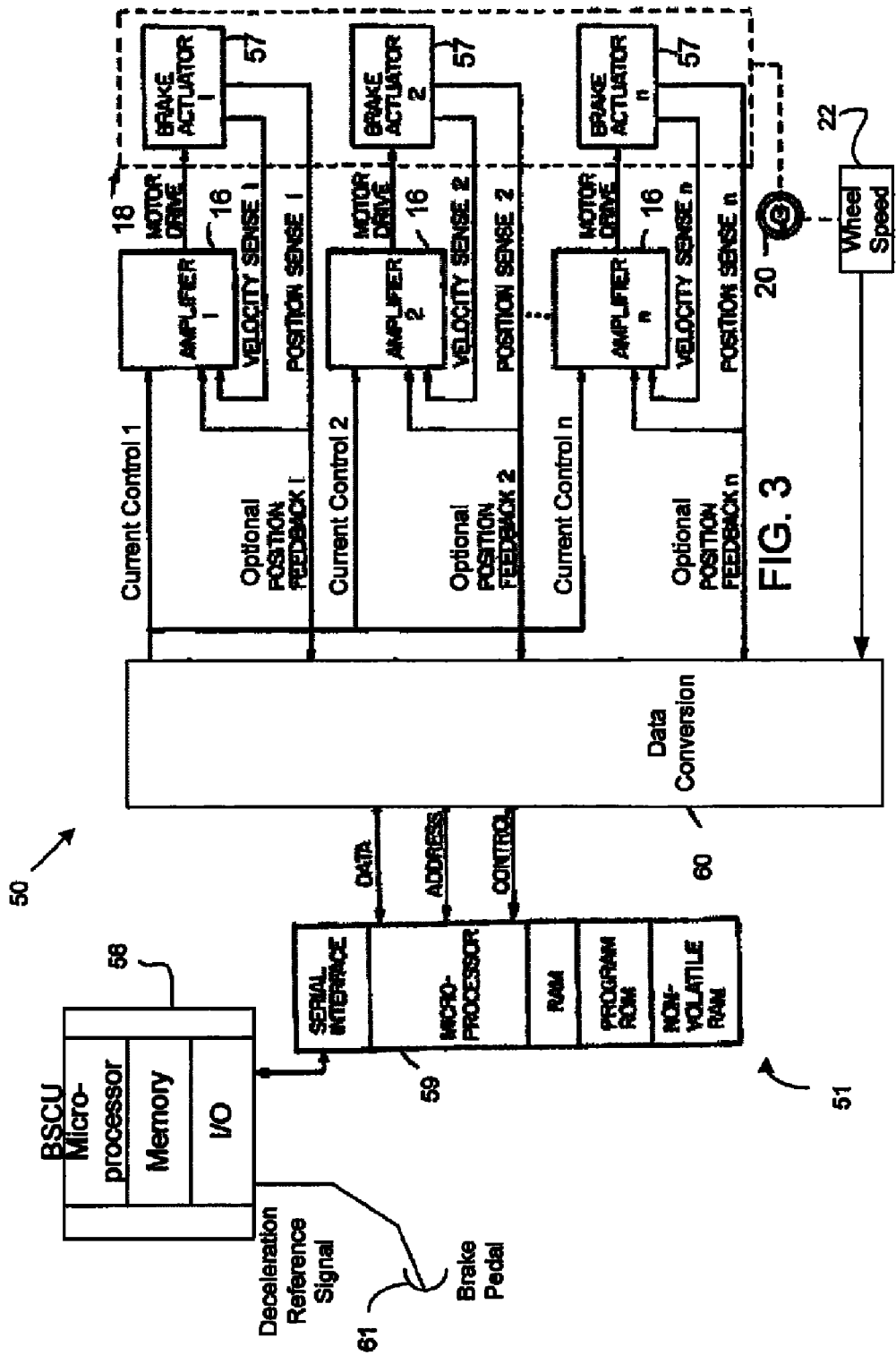
FIG. 3 is a diagrammatic illustration of an exemplary multi-actuator computer controlled brake actuation system.

As used herein, the term "deceleration control" refers to varying a braking force applied to one or more wheels so as to regulate a deceleration rate of a vehicle (e.g., by generating a braking command based on a target vehicle deceleration rate and an actual vehicle deceleration rate). Further, "substantially the same angular velocity" and "substantially the same deceleration rate" means that the angular velocity and/or deceleration rate between two wheels on a landing gear are within ten percent of one another, and more preferably, within five percent of one another.

The principles of the invention will now be described with reference to the drawings. Because the invention was conceived and developed for use in an aircraft braking system, it will be herein described chiefly in this context. However, the principles of the invention in their broader aspects can be adapted to other types of systems. Moreover, the following discussion of an exemplary multi-actuator computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

The present invention provides a brake control system, apparatus and method that employ a control loop configured to regulate vehicle or wheel deceleration, without the need to measure actual pressure, force or position parameters of the brakes. Further, the control loop is configured to derive a target deceleration rate from a brake command device (e.g., from the brake pedal), and to use the target deceleration rate to control the deceleration rate of the wheels and/or vehicle. In this manner, the control loop is simplified relative to conventional control loops used in many prior art braking systems (which derive a target force or pressure signal from a brake command device), and the sensors associated with the pressure, force and/or position data of the brakes and actuators are not needed, thereby reducing weight, complexity and cost of the brake system.

FIG. 1 illustrates an exemplary control loop 10 for a single wheel/brake combination that implements deceleration control. Preferably, each wheel/brake combination is controlled by its own control loop 10, although in certain circumstances it is possible to control multiple wheel/brake combinations via a single control loop. The control loop 10 includes a summing junction 12, which receives a target deceleration rate derived from a brake command device, such as the brake pedal. The summing junction 12 also receives an actual deceleration rate for the controlled wheel (discussed below). The output of the summing junction 12 is provided to a controller 14 (e.g., a PID controller or other controller), which in turn provides a current reference signal to amplifier 16. The amplifier 16 converts the current reference signal into a power signal, which is provided to a brake and actuator assembly 18 so as to provide a braking force to wheel 20 (the amplifier regulates the current supplied to the actuator to correspond with the current reference signal). Wheel speed data then is provided by wheel speed sensor 22, and a deceleration rate of the wheel is calculated at calculation block 24. The output of the calculation block 24 is provided to the summing junction 12 so as to close the loop 10.

As noted above, the target deceleration rate can be derived directly from the brake input device (e.g., a brake pedal). This is in contrast to prior art systems, which derive a pressure or force reference signal from the brake pedal. Preferably, brake pedal deflection is proportional to the generated target deceleration rate, e.g., the greater the deflection, the greater the target deceleration rate. Further, the control loop 10 is preferably implemented within a brake system control unit (BSCU), although it may be implemented in other devices (e.g., within the controller for each electro-mechanical actuator).

In addition to providing braking control without the need for pressure, force or position data, the system, method and apparatus in accordance with the present invention can implement load sharing between brakes and/or brake actuators on the same landing gear. This can be used to overcome instances where even though multiple wheels on the same landing gear experience substantially the same deceleration rate, the brakes and/or brake actuators corresponding to the respective wheels may be applying significantly different braking forces (e.g., one brake is working harder than another brake).

For example, if the target deceleration rate is five feet per second per second, then the BSCU will control the braking force applied by each brake such that the corresponding wheel achieves this deceleration rate. On landing gear that have two or more wheels, the wheels are arranged relatively near one another such that each wheel will experience substantially the same angular velocity (and thus substantially the same deceleration rate), regardless of whether or not the wheel's corresponding brake is performing any work. Therefore, without load sharing, it is possible to have one brake or one brake actuator apply significantly more clamping force than another brake or another brake actuator, yet the control loops corresponding to the respective brakes/actuators may be unaware of the difference in clamping force.

For example, the deceleration rate of five feet per second per second may be satisfied when a brake corresponding to one wheel (e.g., an outboard wheel) is applying eighty percent of its maximum clamping force, and a brake corresponding to another wheel (e.g., an inboard wheel) on the same landing gear is applying only thirty percent of its maximum clamping force. While the deceleration rate is satisfied for both wheels, one brake is clearly performing a greater amount of work, which can lead to overheating and premature failure of the brake.

Similarly, in a brake that includes multiple actuators, the deceleration rate may be achieved if one actuator is applying seventy percent maximum clamping forces, and another actuator is applying forty percent maximum clamping force. To ensure that the respective brakes and/or actuators apply approximately the same clamping force, load sharing between two or more brakes and/or actuators can be implemented. Further details regarding load sharing are discussed below with respect to FIGS. 7 and 8.

Moving to FIG. 2A, there is shown a schematic diagram illustrating an exemplary aircraft 40 having bogie landing gear 42. As is evident, the exemplary bogie landing gear configuration 42 includes eight main wheels. As will be appreciated by those having ordinary skill in the art, other configurations are possible, e.g., six-wheel bogie gears, two wheels on a "twin" gear, a single wheel per gear, etc.

With further reference to FIG. 2B, each wheel/brake/sensor combination on the exemplary landing gear 42 includes a wheel speed sensor 22 and brake and actuator assembly 18. Each wheel speed sensor 22 may be a single channel sensor, although multi-channel sensors may be used to mitigate the potential loss of a speed signal. The wheel speed sensor 22 may be any conventional sensor used to measure wheel speed. Further, data provided by the sensor may be analog data or digital data, for example.

The brake and actuator assembly 18 for each wheel may be electrically operated. FIG. 3 diagrammatically illustrates an exemplary multi-actuator computer controlled electrical brake actuation system 50 to which the principles of the invention may be applied. The major functions of the system 50 are performed by a controller 51 and the brake and actuator assembly 18. The brake and actuator assembly 18 may be mounted in a conventional manner on a wheel to apply and release braking force on the wheel 20. Wheel speed data is provided to the controller 51 via a wheel speed sensor 22 coupled to each wheel 20.

In the exemplary system 50, the brake and actuator assembly 18 includes at least one and preferably a plurality of actuators, such as electro-mechanical actuators (EMAs) 57. The controller 51 includes a corresponding number of independent amplifiers 16, a micro-processor 59 with associated peripherals, and a data input/output (I/O) circuitry 60. As depicted, plural (for example, four) independent control loops control the force applied by respective actuators (each control loop can regulate the electric current provided to the actuator).

As indicated, the displacement of each brake and actuator assembly 18 is controlled by the electronic controller 51. The micro-processor 59 of the controller provides brake control algorithm processing, temporary data storage in RAM, program memory storage, non-volatile data storage, and control of the amplifiers 16 via the input/output circuitry 60. The input/output circuitry 60 provides for digital-to-analog data conversion, generating the analog motor current control commands to the four actuators, and signal discretes for auxiliary functions such as motor brake control. The input/output circuitry 60 may also include analog-to-digital data conversion to monitor the motor current feedback signals, and optionally monitor position and/or force signals from each actuator. The micro-processor 59 may also interface via a serial communication link or other link with other control components as needed, such as, for example, a BSCU 56, which also includes a separate microprocessor and memory, and may have supervisory control over a number of brake controllers 51. Although micro-processors are utilized in the illustrated preferred embodiment, processing could be done analog as opposed to digital, or intermixed with digital processing as may be desired. As used herein, logic circuitry refers to any of micro-processor control, analog control, or intermixed control.

The BSCU 56 receives a signal from a brake command device, such as a brake pedal 61 located in the cockpit, wherein the signal corresponds to pedal deflection, wherein a target deceleration rate is derived from the pedal deflection. As described in more detail below, the BSCU 56, based on the target deceleration rate, controls the brakes without the need to monitor pressure or force applied by the brakes, or a position of the actuator ram, so as to decelerate the vehicle and/or wheels in accordance with the target deceleration rate.

Figure 4:
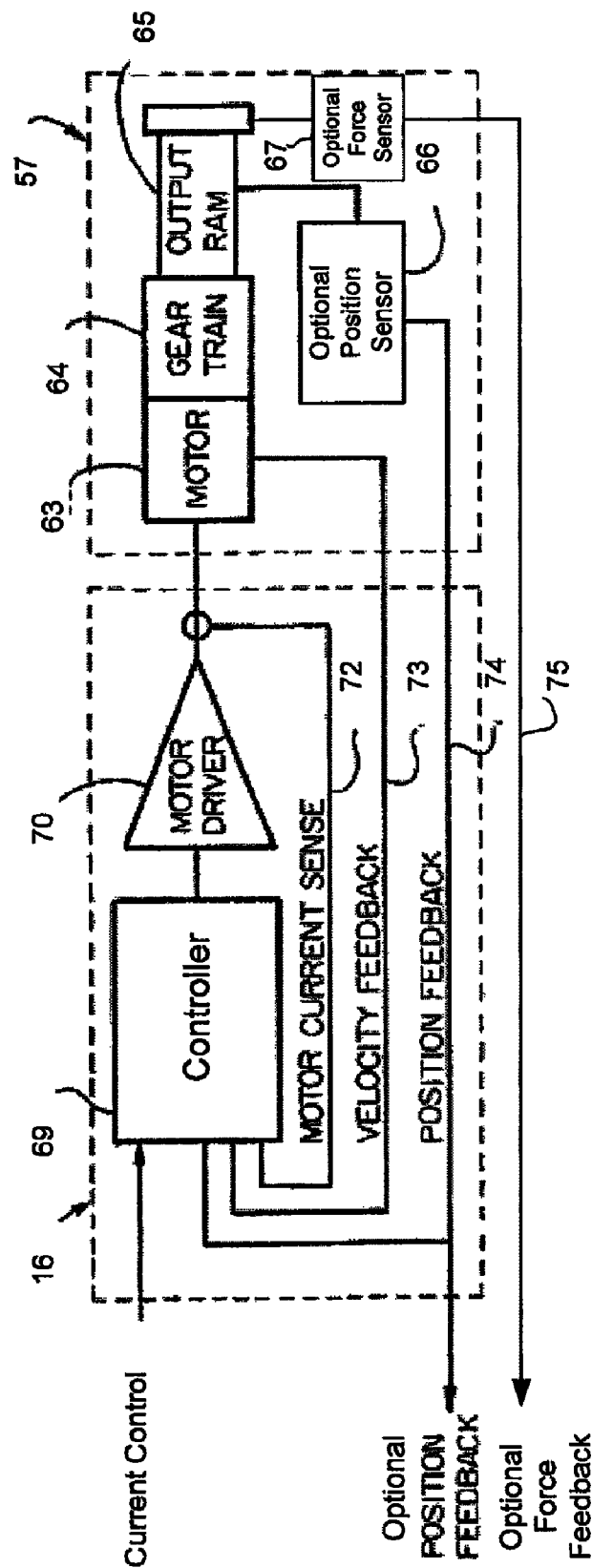
FIG. 4 is a diagrammatic illustration of a brake actuator and associated amplifier employed in the system of FIG. 3.

Moving to FIG. 4, a representative electro-mechanical actuator 57 and associated amplifier 16 are illustrated in greater detail. The brake actuator 57 includes an electric motor 63, gear train 64, and a reciprocating output ram 65. The brake actuator may have associated therewith an optional output ram position sensor 66, which provides for actuator position feedback as depicted, and an optional force sensor 67, which provides data indicative of a force applied by the brake actuator on the brake-disk stack. While such sensors are shown, it is noted that they are not required to implement braking in accordance with the present invention. Although not shown, the actuator 57 may also have associated therewith a motor tachometer to provide for velocity feedback. In the absence of such pressure, force and velocity sensors, open-loop control may be implemented to control the approximate pressure, position and/or velocity. Since the feedback loop in accordance with the present invention is closed based on vehicle deceleration, open loop control is sufficient for position, pressure and velocity control of the brake components.

In one embodiment, one or more actuators corresponding to each brake are controlled using open-loop pressure and/or position control.

The amplifier 16 includes controller 69, and a DC motor driver 70 with associated control logic and current control circuitry. More particularly, the amplifier 16 may include a motor current control loop 72 (which receives a current reference signal from the output of the corresponding deceleration control loop 10) and a velocity loop 73 (which can be used for over speed protection in the event of load loss). The current control loop 72 may be compensated to obtain desired performance in terms of bandwidth, and to provide for uniform dynamic response of all brake and actuator assemblies 18. Since the amplifier 16 can control motor armature current, and torque from a DC motor is proportional to armature current, the output force of the actuator can be controlled with reasonable accuracy. The amplifier 16 also may optionally provide data regarding ram position 74 and force 75 (provided such optional sensors are included in the braking system).

As will be appreciated, the analog input signals may be replaced by digital input signals if a digital signal processor is used in the amplifier for actuator control. The commanded current or the actual current delivered to each motor may be used as an indicator of the actual force applied by the brake and actuator assembly 18.

In the illustrated system, the four amplifiers 16 (FIG. 3) are independent and functionally identical, each amplifier being controlled by the micro-processor 59, responding to motor current control signals from the processor via the I/O circuitry 60. The amplifiers 16 may be configured for closed loop current control, wherein the current supplied to each actuator is regulated to a target current value (the target current value being provided by the corresponding deceleration control loop 10 in the BSCU). Actuator current can be determined from sensors 17 that are typically present in the amplifier 16 and, thus, additional sensors need not be added to measure the actuator current.

Figure 5:
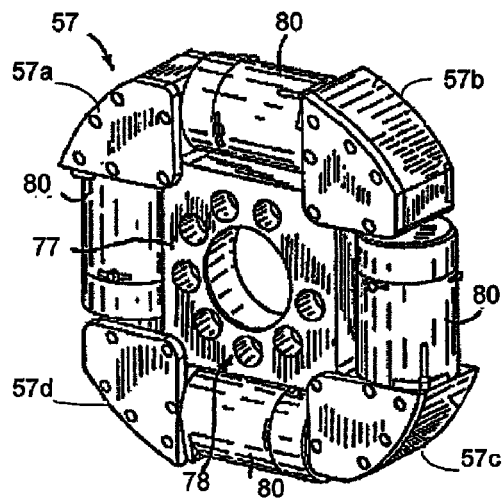
FIG. 5 is a perspective view of an exemplary brake housing and actuator assembly useful in the system of FIG. 3.
Figure 6:
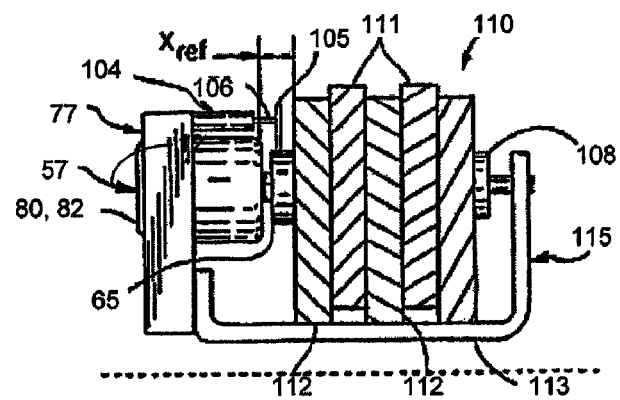
FIG. 6 is a schematic view showing a brake actuator assembly in relation to a brake disk stack.

Further details of an exemplary brake actuator assembly 52 are shown in FIGS. 5-6. The brake actuator assembly includes a housing 77 that provides for the mounting of an electro-mechanical actuator 57, it being understood that typically multiple actuators will be mounted to the housing, such as four functionally identical actuators 57a-57d located at respective quadrants of the housing. The illustrated housing has a bolt circle 78 for mounting to the overall wheel and brake assembly. Each actuator 57 may include, for example, a DC motor 80 and suitable reduction gearing 82 that translates rotary motor motion to linear motion of the ram 65 (the rams are hidden from view in FIG. 5). The DC motor 80 may have integrated or otherwise associated therewith a friction type, fail-safe (power-off engaged) brake (not separately shown), and a resolver (not separately shown) for motor rotor commutation and angular velocity sensing. The resolver provides motor position feedback and velocity information. In particular, the resolver provides an electrical signal that is proportional to motor shaft position.

The ram 65 of each actuator may be mechanically connected to an optional position sensor 104 (e.g., an LVDT sensor), such as by bracket 105. The LVDT armature 106 may be adjustably attached to the bracket (or the sensor body to the brake housing) by suitable means that provides for LVDT setting and position calibration. A cover (not shown), or the like, may be provided to protect the LVDT mounting mechanism.

The purpose of the brake actuator(s) 57 is to impress a clamping force on the stack 110 of brake disk elements. The electro-mechanical (EM) actuator(s) operate simultaneously to produce a clamping force between a brake reaction plate 108 and the actuator output rams 65. An exemplary system utilizes four actuators, operating simultaneously, to provide the total brake clamping force required. However, the size and number of actuators may be varied to provide the total brake clamping force required. The actuators may be operated in current regulation mode such that the clamping force is proportional to the current supplied to the actuator. Although each actuator can operate independently, the actuators may be commanded in pairs (or otherwise), the actuators of each pair being located physically on diametrically opposite sides on the brake housing.

The brake disk stack 110 includes alternating rotor disks 111 and stator disks 112 mounted with respect to a torque tube 113 or similar member and the wheel for relative axial movement. Each rotor disk 111 is coupled to the wheel for rotation therewith and each stator disk 112 is coupled to the torque tube 113 against rotation. A back plate 115 is located at the rear end of the brake disk stack and functions as a force reaction member via the reaction plate 108. The brake actuator 57 is mounted to brake housing 77 fixed with respect to the torque tube. The ram 65 of the actuator extends to compress the brake disk stack 110 against the back plate 115, and torque is taken out by the stator disks 112 through the static torque tube 113 (or the like).

Figures 7, 9A:
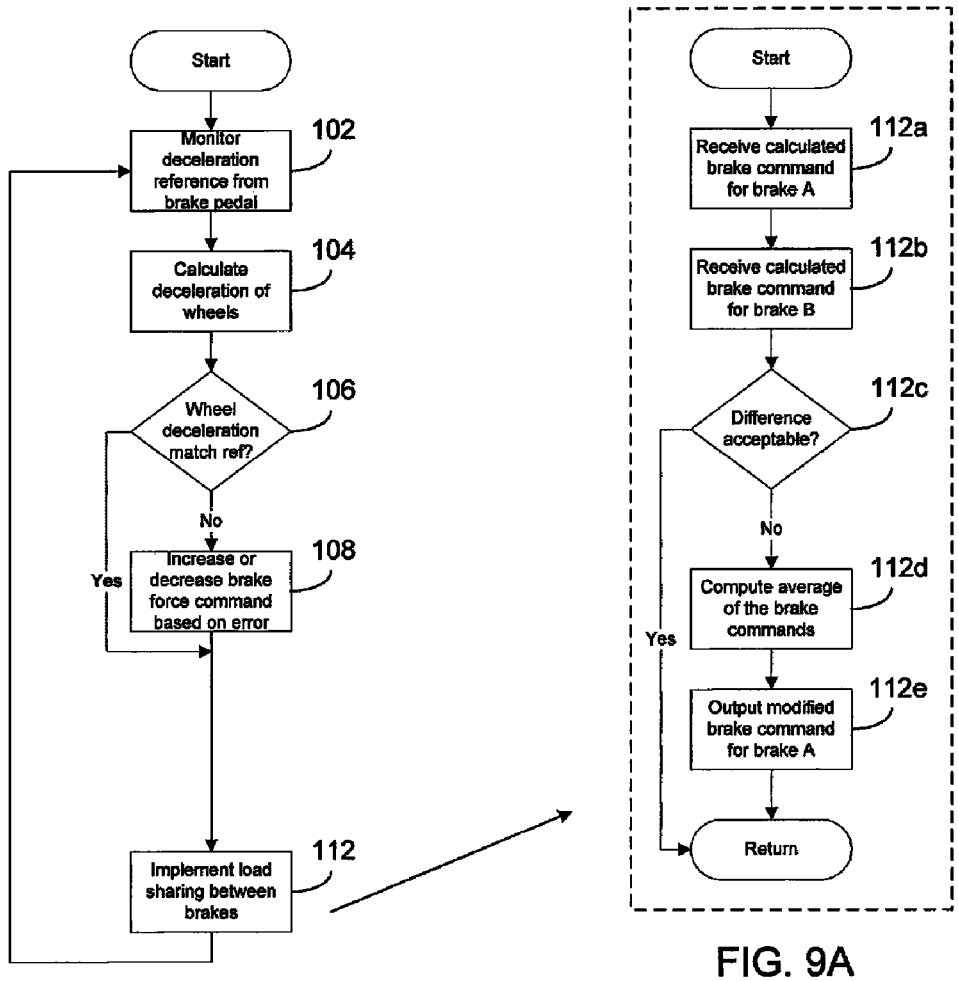
FIG. 7 is a flowchart illustrating an exemplary implementation of a deceleration control in accordance with the invention.
FIG. 9A is a flowchart illustrating an exemplary implementation of load sharing in accordance with the invention.

The BSCU 56 and/or controller 51 (FIG. 3) is/are suitably programmed to carry out a deceleration braking routine in accordance with the invention. As noted above, the deceleration control loop 10 of FIG. 1 provides a current reference signal to a current loop 72 of a corresponding amplifier 16. The outer deceleration control loop 10 regulates a deceleration rate of the vehicle and/or wheel by varying a current supplied to the actuators and, thus a braking force applied to the wheels. To determine the deceleration rate, wheel speed data from the wheel speed sensors 22 can be used. FIG. 7 illustrates a preferred embodiment of the deceleration braking routine 100.

Beginning at block 102 of FIG. 7, a brake pedal deflection signal from a braking command device, such as a brake pedal, is monitored. The brake pedal deflection signal may be an analog voltage or current signal provided from a potentiometer operatively coupled to the brake pedal, for example. The signal may be provided to the BSCU 56 via an analog input channel (e.g., a 0-5 volt or a 4-20 mA channel). Alternatively, the brake pedal may be communicatively coupled to the BSCU 56 via a serial communication link such that the pedal deflection signal can be digitally communicated to the BSCU 56. The BSCU 56 can scale the brake pedal deflection signal into a target deceleration rate that is used to control the brakes. For example, full pedal deflection may be correlated to a predetermined maximum deceleration rate (e.g., 100 feet per second per second), and no pedal deflection may be correlated to a deceleration rate of zero (i.e., no deceleration). Pedal deflection values between these two ranges can be configured such that the amount of pedal deflection proportionally corresponds to the target deceleration rate (e.g., 25 percent pedal deflection can correspond to a target deceleration rate of 25 feet per second per second). Alternatively, the correlation between pedal deflection and target deceleration rate may be non-linear and/or based on a predetermined function (e.g., 0-25% deflection may correspond to 0-10% of the maximum deceleration rate, and 26%-100 percent pedal deflection may correspond to 11%-100% of the maximum deceleration rate).

Next at block 104, the actual deceleration rate of the vehicle is determined. In an aircraft, the deceleration rate may be calculated from data provided to the BSCU 56 by wheel speed sensors 22. For example, deceleration of the wheel can be calculated by reading the wheel data at a first time (t1) and then reading the wheel data at a second time (t2), taking the difference between two wheel speed readings, and then dividing the difference by the time period (t2−t1). As will be appreciated, such deceleration calculation is carried out multiple times through the entire braking period. Preferably, signal conditioning, such as filtering, averaging, etc. is employed to minimize the effect of noise and other disturbances on the calculated deceleration rate.

At block 106, the target deceleration rate as determined from the brake pedal deflection and the actual deceleration rate as calculated from the wheel speed sensors are compared. More particularly, if the target deceleration rate and the calculated deceleration rate are different, then at block 108 the BSCU 56 will command more or less current to the actuators so as to increase or decrease the braking force and, thus, alter the deceleration rate of the wheels/vehicle.

For example, if the calculated actual deceleration rate is less than the target deceleration rate, then the BSCU 56 will command additional current be provided to the actuators so as to increase the braking force. The increased braking force will cause the deceleration rate of the wheels to increase toward the target deceleration rate. Conversely, if the target deceleration rate is less than the calculated actual deceleration rate, then the BSCU 56 will command less current be provided to the actuators, thereby decreasing the braking force and causing the deceleration rate of the wheels to decrease toward the target deceleration rate. This process can be performed iteratively such that the actual deceleration rate corresponds to the target deceleration rate.

Moving back to block 106, if the target deceleration rate and the actual deceleration rate are equal (or within a predetermined tolerance of one another), then block 108 is skipped and the method moves to block 112 and load sharing is implemented.

In performing load sharing, the braking forces (as determined, for example, by commanded actuator current, measured actuator current, or measured ram position) applied by two or more brakes and/or two or more brake actuators are compared. If the forces are within a predetermined range of one another, no action may be taken and the method may move back to block 102. However, if there is a significant difference between the respective braking forces (i.e., the forces are not within a predetermined range of one another), then the current reference signal provided to an amplifier of one or both brakes/brake actuators may be modified in an attempt to equalize the work performed by each brake and/or actuator. After modifying the current reference signal for the respective amplifier, the method moves back to block 102 and repeats. Further details with respect to load sharing are discussed below.

Figure 8:
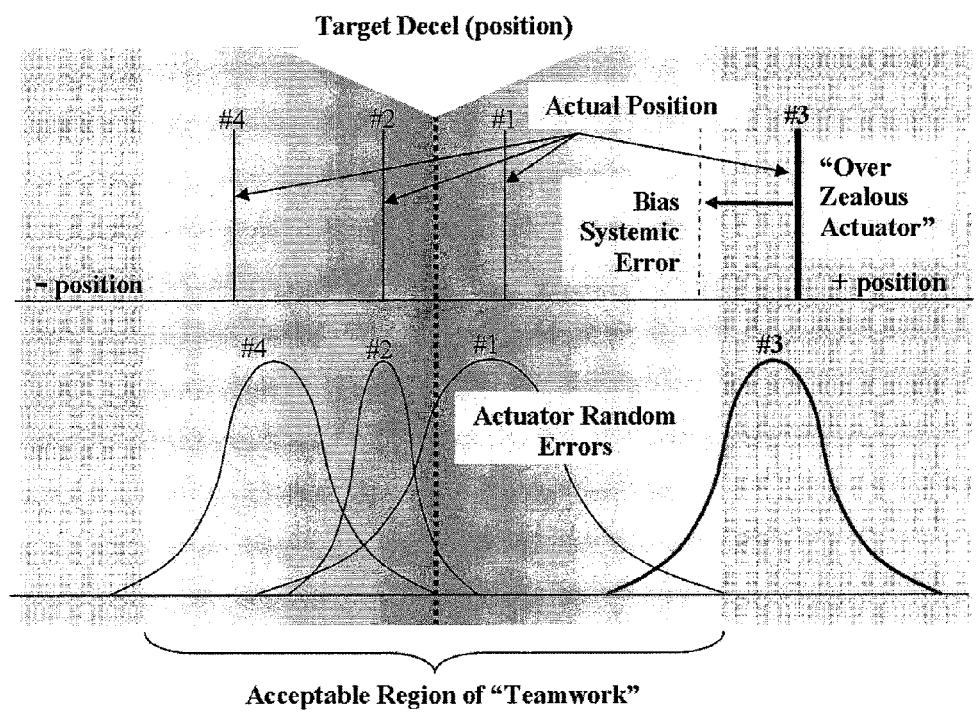
FIG. 8 is a graph showing one brake actuator performing more work than other actuators while a target deceleration rate is satisfied.

FIG. 8 illustrates an exemplary case where the work load is not shared between brake actuators. In particular, one actuator (actuator #3) is performing more work than other actuators (actuators #1, #2 and #4) during deceleration controlled braking. The curves shown in FIG. 8 are representative of a clamping force applied by each actuator, and may be a position signal corresponding to a position of the actuator ram, or a current signal corresponding to a current provided to the actuator. Current and/or position sensors for measuring these parameters are typically included in electric brake systems and thus no further sensors are required to obtain such data.

If the relative positions of the actuator rams are all within a predetermined range of one another, or if the difference in current between each actuator is within a predetermined threshold, then it can be concluded that the brakes are sharing the load. However, if the position and/or current of one or more brakes do not agree with the position and/or current of other brakes, then it can be concluded that some brakes are performing more work than other brakes. Such lack of sharing, which is shown in FIG. 8, can be corrected using a bias setting.

For example, in a simple two-wheeled aircraft (one wheel on each landing gear), assume that the brakes have not been applied, and thus the deceleration commanded is zero. When the pilot or autobrake system calls for braking (deceleration) the actuators respond independently to achieve the desired result (to decelerate the wheel). For simplicity, a static deceleration is examined. The response of the actuators may appear as shown in FIG. 8, which shows the actuators moving to apply a clamping force that makes the aircraft decelerate. The deceleration is satisfied by four different actuators, but the position and/or current (or other signal indicative of braking effort) of actuator #3 is significantly different from that of the other actuators. Since the controller is controlling the deceleration of the wheel and the actual deceleration rate satisfies the requested deceleration rate, the controller is unaware of any problems even though the loads are unequal. To compensate for the unequal loads, the command signal for one actuator, e.g., actuator #3, can be biased down, which results in the signal for actuator #3 moving left in FIG. 8, and the actuator signals of the remaining actuators moving right (to take up the work no longer done by actuator #3). A new equilibrium is reached and the system is the load applied by each actuator is approximately equal.

Instead of a simple two-wheel aircraft, a four-wheeled aircraft with two brakes on each gear is now assumed. Given an inboard and outboard brake for each wheel, one brake could do 100% of the work to decelerate the wheel, and the other brake may do 0% of the total work (this could happen if one brake has a control delay of 5 seconds). Now the average of the sum of the inboard actuator's measured value and the outboard actuator's measured value should be the open loop target for each brake. This will force the workload to be shared (50% for the inboard and 50% for the outboard). The speed (rate) that these targets have to change need not be fast, so dynamic instabilities can be avoided. Just as FIG. 8 illustrates individual actuators on each gear, it just as well could be representative of a four-wheeled bogie gear. Again, if one or more brakes is outside the acceptable region (#3 brake is doing too much work), a bias adjustment is made to the command (decel) level. This will cause all brakes to resettle into a new workload scheme.

The bias adjustment may be manually set during a calibration phase of the brake system, or it may be automatically set during normal braking operations. More particularly, the brake control system may automatically adjust the bias setting corresponding to each brake and/or brake actuator to cause the workload performed by each actuator to be about the same.

For example, the workload performed by each actuator may be integrated to obtain an average workload for each actuator. The average workload can be determined, for example, by integrating the current provided to each actuator for a brake operation (or integrating the position of each actuator for a brake operation). Such determination may be performed for each landing, over an entire day, over an entire month, etc. Preferably, the integration period "rolls" (old information fades out such that the calculation is biased toward current brake activity) so that a new actuator installation will not require knowledge of an actuator change-out.

Once calculated, the average workload for each actuator can be compared to that of other actuators. If one or more actuators are out of line relative to other actuators, the bias setting for those actuators can be automatically adjusted to equalize the workload performed by each actuator.

Figure 9B:
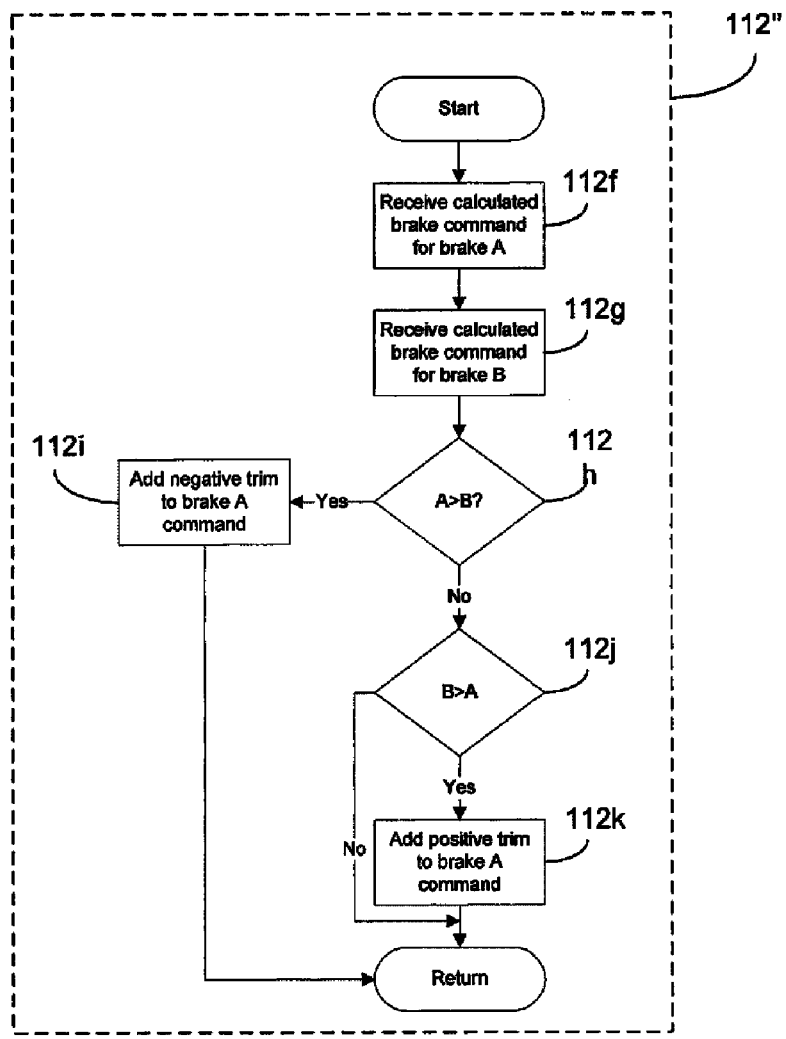
FIG. 9B is a flowchart illustrating another exemplary implementation of load sharing in accordance with the invention.
Figure 9C:
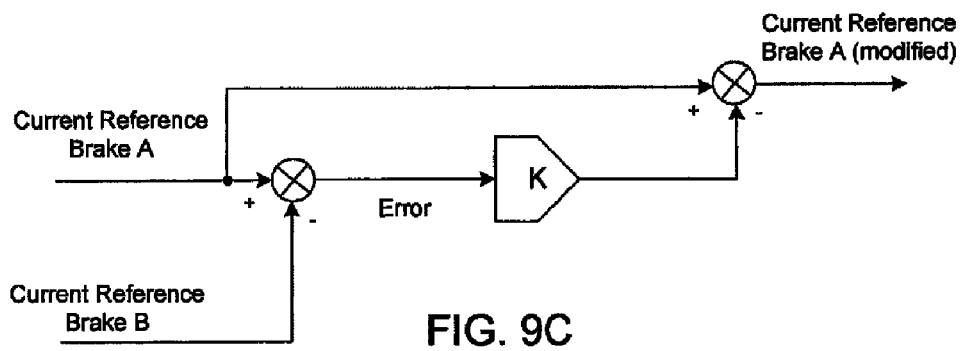
FIG. 9C is a block diagram illustrating an exemplary control loop that may be used to implement the load sharing routine according to FIG. 9B.

FIGS. 9A and 9B illustrate two exemplary methods of performing load sharing as provided at block 112. Beginning with FIG. 9A, a first method 112' is shown wherein at blocks 112a and 112b the present calculated current reference (i.e., the current reference as determined during the present iteration) is received for a first brake actuator (e.g., actuator A) and a second brake actuator (e.g., actuator B). Next at block 112c the two (or more) current reference values for each actuator are compared to determine if they are within an acceptable range of one another (e.g., within ten percent, and more preferably, five percent of one another). If they are within an acceptable range of one another, then no correction is required and the method returns to block 102. However, if the two current references are not within an acceptable range of one another, then at block 112d the average value of the two current references is computed. Based on the average value, the current reference provided to the amplifier corresponding to one of the actuators (e.g., actuator A) is modified and then the method moves back to block 102. Since the current reference value (e.g., for actuator A) has been modified relative to the calculated value, the actual braking force applied by actuator A will increase or decrease so as to correspond to the modification. This will cause the braking force applied by the respective actuators to equalize (i.e., share the load). For example, if the braking force applied by actuator A is increased, then, to maintain the same deceleration rate of the wheel, the braking force applied by actuator B will decrease.

Moving now to FIG. 9B, an alternative load sharing routine 112" is illustrated. Beginning at blocks 112f and 112g the present calculated current reference (i.e., the current reference as determined during the current iteration) is received for a first brake actuator (e.g., actuator A) and a second brake actuator (e.g., actuator B). Next at block 112h, it is determined if the calculated current reference for actuator A is greater than the calculated current reference for actuator B. If yes, then at block 112i a negative trim is added to the current reference for actuator A (preferably, the current reference for actuator B is not modified).

The negative trim may be based on the difference between the two current references (and scaled by a gain value K). In this context, the trim may be said to be controlled by a proportional controller, and is shown schematically in FIG. 8C. As will be appreciated, other controllers may be implemented (e.g., a proportional plus integral controller) depending on the dynamics and desired performance characteristics of the system. Once the negative trim has been added to the current reference for actuator A, the modified current reference is provided to the corresponding amplifier and the method returns to block 102.

The load share routine may have complete control over the current reference signal (i.e., the capability to alter the current reference signal from its minimum value to its maximum value), or the load share routine may have limited control (e.g., based on a percentage of maximum current). Preferably, the control range provided to the load share routine is plus or minus twenty percent, and more preferably plus or minus ten percent of the maximum current reference signal (e.g., if the maximum current reference signal is 1000 and the load share routine has 10% control, then the load share routine may trim the current reference signal up or down by 100).

Moving back to block 112h, if the current reference for actuator A is not greater than the current reference for actuator B, then at block 112j it is determined if the opposite is true, i.e., is the current reference for actuator B greater than the current reference for actuator A. If not, then no correction is required and the method returns to block 102. However, if yes, then at block 112k a positive trim value is added to the current reference for actuator A. Again, the trim may be based on the difference between the two current references (and scaled by a gain value K) and/or based on other types of controllers. Once the positive trim has been added to the current reference for brake A, the modified current reference is provided to the corresponding amplifier and the method returns to block 102.

Accordingly, a brake controller, system, and method are provided that can provide controlled braking without the need for pressure, force or position sensors. This minimizes weight of the braking system and also reduces the overall costs of the system.

A person having ordinary skill in the art of computer programming and applications of programming for computer systems would be able in view of the description provided herein to program the BSCU to operate and to carry out the functions described herein. Accordingly, details as to the specific programming code have been omitted for the sake of brevity. Also, while software in the memory or in some other memory of the BSCU may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements in accordance with the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake controller for controlling a brake system of a vehicle comprising
a brake input device,
a plurality of rotating wheels and a plurality of electrically operated brakes, each brake of the plurality of brakes corresponding to one wheel of the plurality of wheels and operative to provide a braking force thereto,
at least two rotating wheels in the plurality of rotating wheels configured so as to rotate at substantially the same angular velocity,
the brake controller comprising logic circuitry configured to:
receive data indicative of a deflection of the brake input device;
use the data indicative of the deflection of the brake input device to derive a target deceleration rate;
provide a braking command to each of the plurality of brakes, wherein the logic circuitry is further configured to vary the braking command for each brake to regulate a deceleration rate of the vehicle in accordance with the target deceleration rate,
receive data indicative of wheel deceleration,
use the data indicative of wheel deceleration to regulate the deceleration rate of the vehicle, and
share a brake load between the brakes of the at least two rotating wheels.

2. The brake controller according to claim 1, wherein the logic circuitry is configured to regulate the deceleration rate without using force or pressure data indicative of a force or pressure applied by the brake.

3. The brake controller according to claim 1, wherein each brake includes at least two brake actuators, and the logic circuitry is configured to share a braking load between the at least two brake actuators or between at least two brakes.

4. The brake controller according to claim 3, wherein the logic circuitry configured to share the brake load includes logic circuitry configured to:
determine a braking effort performed by each brake or each brake actuator; and
adjust a bias setting corresponding to brakes or actuators that have a braking effort that is greater than braking efforts corresponding to other brakes or other brake actuators.

5. The brake controller according to claim 1, wherein the logic circuitry is further configured to:
receive wheel speed data from a plurality of wheel speed sensors, each wheel speed sensor corresponding to one wheel of the plurality of wheels and operative to provide data indicative of wheel speed;
calculate a deceleration rate of each wheel from the corresponding wheel speed sensor; and
individually sum the calculated deceleration rate for each wheel with the target deceleration rate to obtain a deceleration rate error for each wheel.

6. The brake controller according to claim 1, wherein each brake includes at least one brake actuator, and the logic circuitry is further configured to generate at least one open-loop brake actuator control signal for controlling a force applied by the at least one brake actuator.

7. A brake system comprising the brake controller according to claim 1, wherein the brake input device is configured to provide a signal indicative of deflection of the brake input device.

8. A brake system comprising the brake controller according to claim 1, wherein the at least two wheels comprise a first wheel and a second wheel having a first brake and second brake, respectively, and the brake controller configured to generate a first braking command corresponding to the first brake, and a second brake controller configured to generate a second braking command corresponding to the second brake, the first and second braking commands indicative of a braking force to be applied by the corresponding first and second brakes, wherein logic circuitry of the brake controller and the second brake controller is configured to receive brake data indicative of the braking force applied by the brake corresponding to the other of the brake controller and the second brake controller, and modify the brake command for the brake corresponding to one of the brake controller and the second brake controller based on the brake data corresponding to the other of the brake controller and the second brake controller.

9. A brake system comprising the brake controller according to claim 1, comprising a plurality of wheel speed sensors, each wheel speed sensor corresponding to one wheel of the plurality of wheels and operative to provide data indicative of wheel speed.

10. A brake system comprising the brake controller according to claim 1, wherein each brake includes at least two brake actuators, wherein the brake controller includes logic circuitry configured to share a brake load between the at least two brake actuators.

11. A method of controlling a brake system of a vehicle having a brake input device, a plurality of rotating wheels and a plurality of electrically operated brakes, each brake of the plurality of brakes corresponding to one wheel of the plurality of wheels, comprising:
receiving data indicative of a deflection of the brake input device;
using the data indicative of the deflection of the brake input device to derive a target deceleration rate;
providing a braking command to each of the plurality of brakes, wherein the braking command is varied for each brake to regulate a deceleration rate the vehicle in accordance with the target deceleration rate, wherein at least two wheels are configured so as to rotate at substantially the same angular velocity, and each wheel has a corresponding brake; and
sharing a brake load between brakes of the at least two wheels.

12. The method according to claim 11, wherein the deceleration rate of each wheel is regulated without using force or pressure data indicative of a force or pressure applied by the brake.

13. The method according to claim 11, wherein sharing includes: averaging a braking load applied by the at least two brakes; and
using the average braking load as the braking command for at least one of the at least two brakes.

14. The method according to claim 11, wherein the at least two wheels comprise a first wheel having a first brake and a second wheel having a second brake, and a first controller controls the first brake and a second controller controls the second brake, wherein sharing comprises:
the first controller generating a first braking command corresponding to the first brake, the first braking command indicative of a braking force to be applied by the first brake;

the second controller generating a second braking command corresponding to the second brake, the second braking command indicative of a braking force to be applied by the second brake;

providing to one of the first controller or the second controller the braking command from the other of the first controller or the second controller; and the receiving controller calculating, based on the first and second braking commands, a brake force correction value for at least one of the first controller or the second controller.

15. The method according to claim 11, wherein the braking system further includes a plurality of wheel speed sensors, each wheel speed sensor corresponding to one wheel of the plurality of wheels and operative to provide data indicative of wheel speed, the method further comprising:

calculating a deceleration rate of each wheel from the corresponding wheel speed sensor; and individually summing the calculated deceleration rate for each wheel with the target deceleration rate to obtain a deceleration rate error for each wheel.

16. The method according to claim 11, wherein each brake of the plurality of brakes includes at least one actuator, further comprising providing an open-loop control signal to the at least one actuator to control a force applied by the at least one actuator.

* * * * *